(12) United States Patent
Weingarten

(10) Patent No.: US 8,689,815 B2
(45) Date of Patent: Apr. 8, 2014

(54) AIR RELEASE VENT VALVE

(75) Inventor: Zvi Weingarten, Kibbutz Evron (IL)

(73) Assignee: Bermad CS Ltd., Kibbutz Evron (IL)

( * ) Notice: Subject to any disclaimer, the term of this patent is extended or adjusted under 35 U.S.C. 154(b) by 110 days.

(21) Appl. No.: 13/271,248

(22) Filed: Oct. 12, 2011

(65) Prior Publication Data

US 2013/0092254 A1 Apr. 18, 2013

(51) Int. Cl.
*F16K 24/04* (2006.01)

(52) U.S. Cl.
USPC .......................... 137/202; 137/411; 137/430

(58) Field of Classification Search
USPC .......... 137/197, 198, 199, 202, 411, 429, 430
See application file for complete search history.

(56) References Cited

U.S. PATENT DOCUMENTS

| | | | | |
|---|---|---|---|---|
| 4,209,032 A | * | 6/1980 | Drori | 137/202 |
| 4,696,321 A | * | 9/1987 | Reese et al. | 137/202 |
| 5,003,927 A | * | 4/1991 | Thompson | 119/72.5 |
| 5,511,577 A | * | 4/1996 | Richards et al. | 137/202 |
| 2002/0074037 A1 | * | 6/2002 | Enge | 137/202 |
| 2005/0161085 A1 | * | 7/2005 | Haunhorst et al. | 137/202 |
| 2008/0276994 A1 | * | 11/2008 | Goetzinger et al. | 137/218 |
| 2012/0037834 A1 | * | 2/2012 | Lang et al. | 251/368 |

* cited by examiner

*Primary Examiner* — Craig Schneider
*Assistant Examiner* — Ian Paquette
(74) *Attorney, Agent, or Firm* — Mark M. Friedman

(57) ABSTRACT

An air release vent valve having a valve body with an inlet port and a venting orifice; a direct float configured with an axial passageway; and a displaceable orifice closure rod deployed in at least a portion of the axial passageway, the displaceable orifice closure rod being longitudinally displaceable therein, wherein at least of portion of the displaceable orifice closure rod extends above the direct float and at least a portion of the displaceable orifice closure rod is configured to close the venting orifice when the water level in the valve body reaches a predetermined level. Also disclosed is a suspended surge prevention element that is suspended within the valve body at an adjustable distance from the venting orifice and configured to seal the initial vent orifice in response to a velocity of the flow of air through the valve body.

10 Claims, 8 Drawing Sheets

AIR RELEASE VENT VALVE

FIELD AND BACKGROUND OF THE INVENTION

The present invention relates to pipeline air release vent valves and, in particular, it concerns a pipeline air release vent valve having a bi-water-level two stage delayed air vent action.

It is known to provide pipelines with automatic air release valves designed to release entrapped pockets of air usually accumulated at high points along the pipeline. These air release valves are designed to release the entrapped pockets of air while the pipeline is operational and pressurized.

Automatic air release valves in common use today comprises a valve body with a relatively small diameter venting orifice mounted on the top cover of the air release valve. A direct action float with a resilient seal mounted on its top seals the venting orifice as the float rises with the water level within the valve body. The float drops and opens the venting orifice when the water level within the valve body recedes; thereby resuming the operation of releasing the entrapped air within the pipeline.

It will be understood that the rise of the water level within the valve body after the float has sealed the vent orifice creates a situation in which the pressure inside the valve body is higher than the ambient air pressure. Therefore, the direct action float must have a weigh suitable to overcome the pressured differential and open the vent orifice upon the recess of water within the valve body.

Consequently, a float with such significant weigh has relatively low buoyancy and rides low in the water. This brings the water level close to the float's top seal. As a result, as the water level in the valve body rises, the water itself comes in close proximity of the vent orifice, causing a mist of water to spray out of the orifice as it is closing, thereby wetting the outer surface of the air release valve and the surrounding environment. A similar situation occurs when the valve opens. As the valve opens to allow air to enter the pipeline, water near the orifice may splashout.

It should be noted that some automatic air release valves employ a float and lever mechanism to over come this problem, but these valves suffer from utilizing hinged and/or rotating parts that may stick or otherwise become inoperable over time.

There is, therefore, a need for an air release vent valve having a bi-water-level two stage delayed air vent action that distances the air venting orifice from the surface of the water with in the valve body, thereby preventing water mist form spraying out.

SUMMARY OF THE INVENTION

The present invention is an air release vent valve having a bi-water-level two stage delayed air vent action According to the teachings of the present invention there is provided, an air release vent valve comprising: (a) a valve body having an inlet port and a venting orifice; (b) a direct float configured with an axial passageway; and (c) a displaceable orifice closure rod deployed in at least a portion of the axial passageway, the displaceable orifice closure rod being longitudinally displaceable therein; wherein at least of portion of the displaceable orifice closure rod extends above the direct float and at least a portion of the displaceable orifice closure rod is configured to close the venting orifice when a water level in the valve body reaches a predetermined level.

According to a further teaching of the present invention, a portion of the displaceable orifice closure rod is deployed within an orifice cap in which the venting orifice is configured.

According to a further teaching of the present invention, at least a portion of the displaceable orifice closure rod is hollow.

According to a further teaching of the present invention, the venting orifice is configured as an initial vent orifice configured in the valve body and a secondary vent orifice, wherein the initial vent orifice is larger than the secondary vent orifice, the air release vent valve further including a displaceable vent orifice sealing element that is responsive to both a liquid level within the valve body and any pressure differential between an ambient outside pressure and a pressure within the valve body and the secondary vent orifice is configured in the displaceable vent orifice sealing element.

According to a further teaching of the present invention, there is also provided a suspended surge prevention element that is suspended within the valve body below the initial orifice, the suspended surge prevention element configured with at least one surge prevention orifice that is larger than the secondary orifice so as to at least partially seal the initial orifice in response to a velocity of a flow of air through the valve body and the surge prevention element is held in such a deployment by a pressure differential between an ambient outside pressure and a pressure within the valve body.

According to a further teaching of the present invention, the at least one surge prevention orifice is configured as a as a plurality of surge prevention orifices According to a further teaching of the present invention, an air flow rate through the venting orifice is adjusted by plugging one or more of the plurality of surge prevention orifices.

According to a further teaching of the present invention, the suspended surge prevention element is suspended by an adjustment mechanism that includes: (a) a height adjustment rod extending from the suspended surge prevention element; and (b) a support bridge that spans the initial orifice.

There is also provided according to the teachings of the present invention, an air release vent valve comprising: (a) a valve body having an inlet port and an initial vent orifice; (b) a direct float; (e) a suspended surge prevention element that is suspended within the valve body below the initial orifice, the suspended surge prevention element is configured to seal the initial vent orifice in response to a velocity of a flow of air through the valve body, the suspended surge prevention element being drawn upward by the flow of air through the valve body and the surge prevention element is held in such a deployment by a pressure differential between an ambient outside pressure and a pressure within the valve body; wherein the suspended surge prevention element is configured with a at least one surge prevention orifice.

According to a further teaching of the present invention, there is also provided: (a) an axial passageway configured in the direct float; and (b) a displaceable orifice closure rod deployed in at least a portion of the axial passageway, the displaceable orifice closure rod being longitudinally displaceable therein; wherein at least of portion of the displaceable orifice closure rod extends above the direct float and at least a portion of the displaceable orifice closure rod is configured to close the secondary vent orifice when a water level in the valve body reaches a predetermined level.

According to a further teaching of the present invention, the suspended surge prevention element is configured with at least one surge prevention orifice that is smaller than the initial vent orifice so as to at least partially seal the initial vent orifice in response to a velocity of a flow of air through the valve body and the surge prevention element is held in such a deployment by a pressure differential between an ambient outside pressure and a pressure within the valve body.

According to a further teaching of the present invention, the at least one surge prevention orifice is configured as a as a plurality of surge prevention orifices According to a further teaching of the present invention, an air flow rate through the venting orifice is adjusted by plugging one or more of the plurality of surge prevention orifices.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an air release vent valve having a bi-water-level two stage delayed air vent action that distances the air venting orifice from the surface of the water with in the valve body, thereby preventing water mist form spraying out.

The principles and operation of an air release vent valve according to the present invention may be better understood with reference to the drawings and the accompanying description.

By way of introduction, it should be understood that all of the embodiments of the present invention share the common feature of having a bi-water-level two stage delayed air vent action that distances the air venting orifice from the surface of the water with in the valve body, thereby preventing water mist form spraying out.

Figure 4:
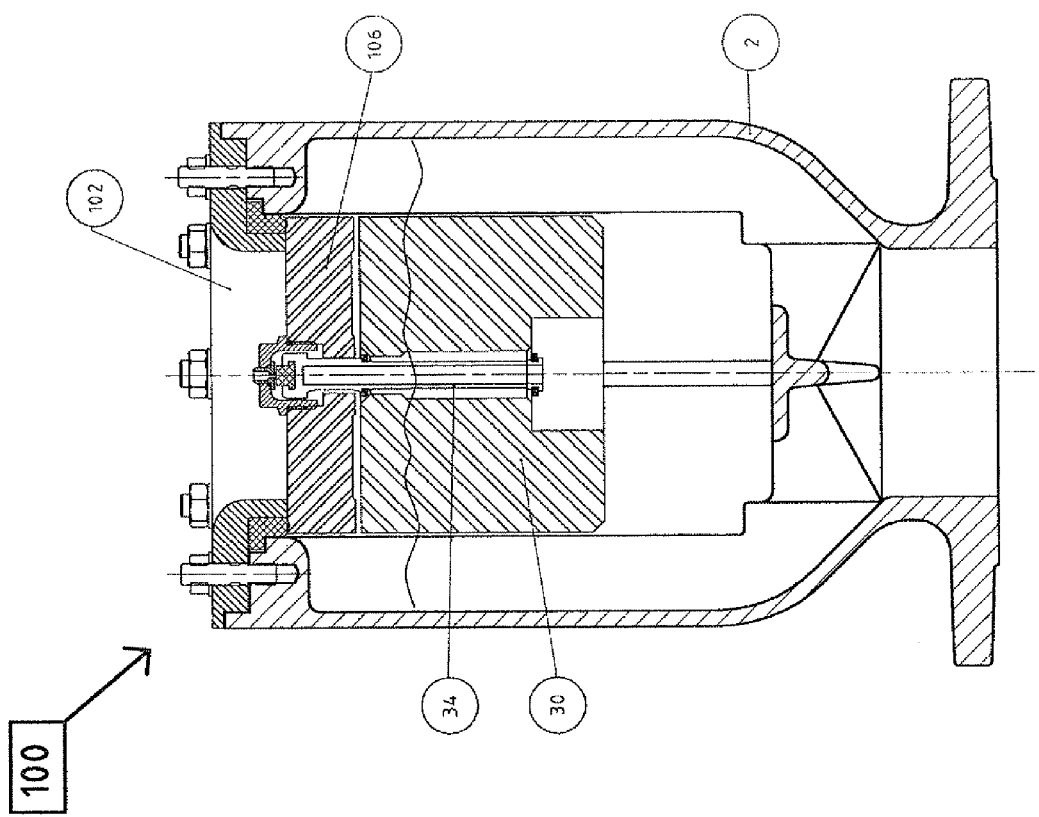
FIG. 4 is a cross sectional view of a second preferred embodiment of an air release vent valve constructed and operational according to the teachings of the present invention, shown here at a fully open deployment.
Figure 5:
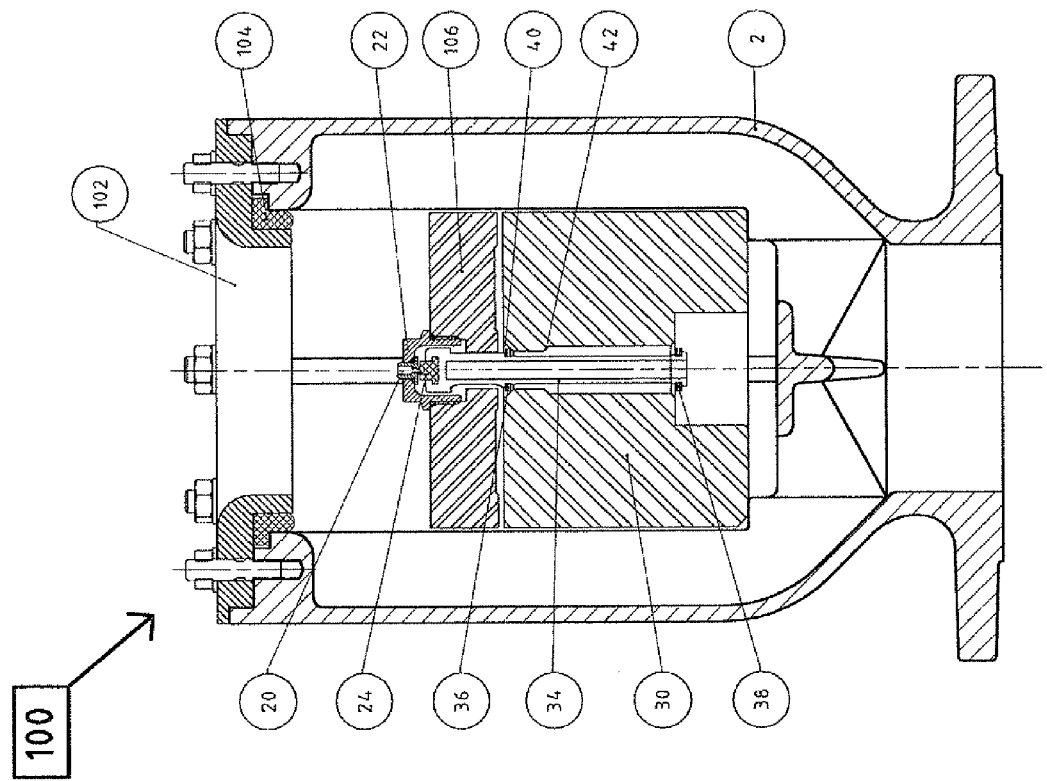
FIG. 5 is a cross sectional view of the air release vent valve of FIG. 4, shown at a fully closed deployment.
Figure 6:
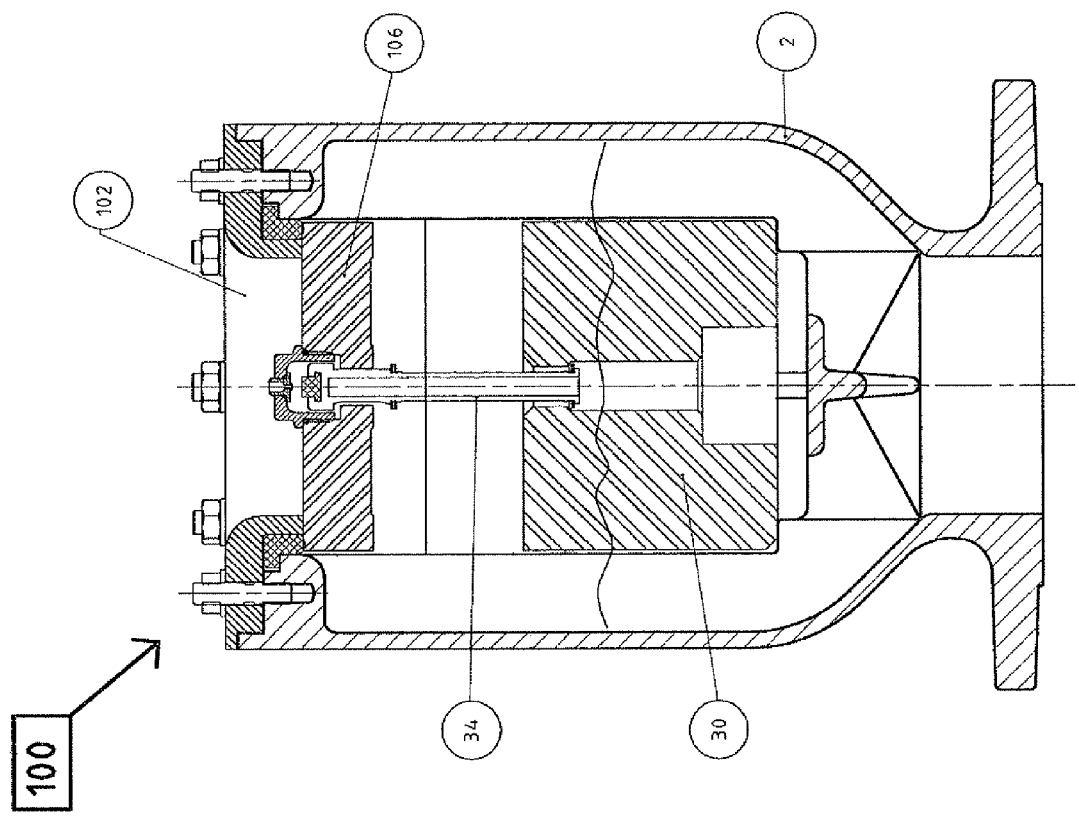
FIG. 6 is a cross sectional view of the air release vent valve of FIG. 4, shown at a partially open deployment.
Figure 7:
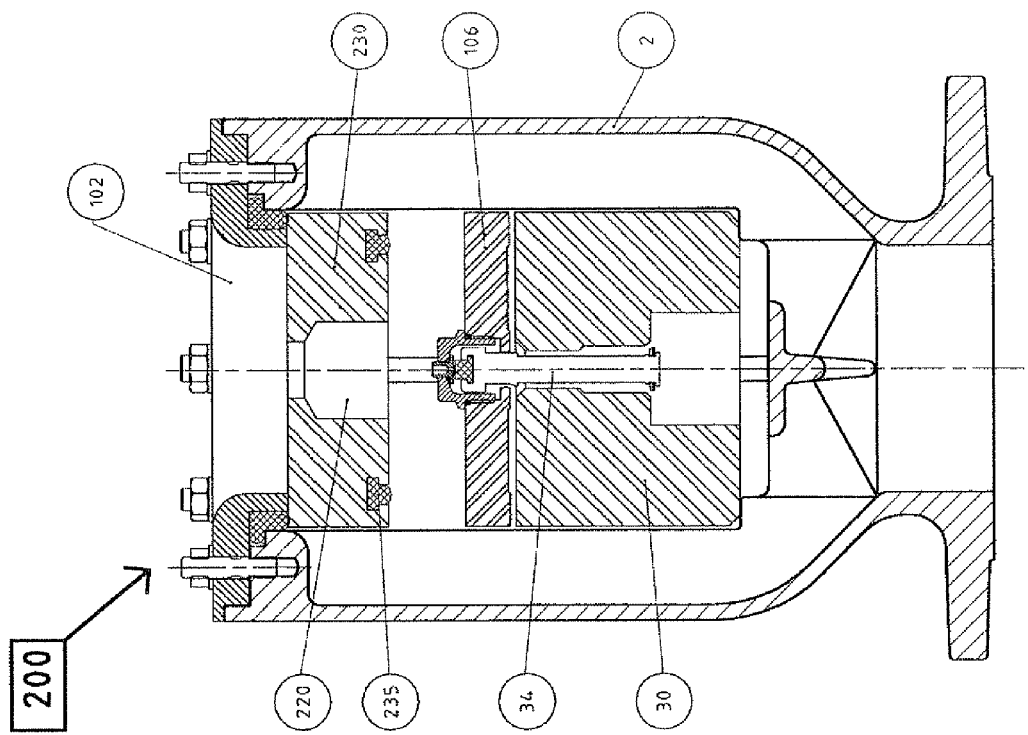
FIG. 7 is a cross sectional view of a third preferred embodiment of an air release vent valve constructed and operational according to the teachings of the present invention, shown here at a fully open deployment.
Figure 8:
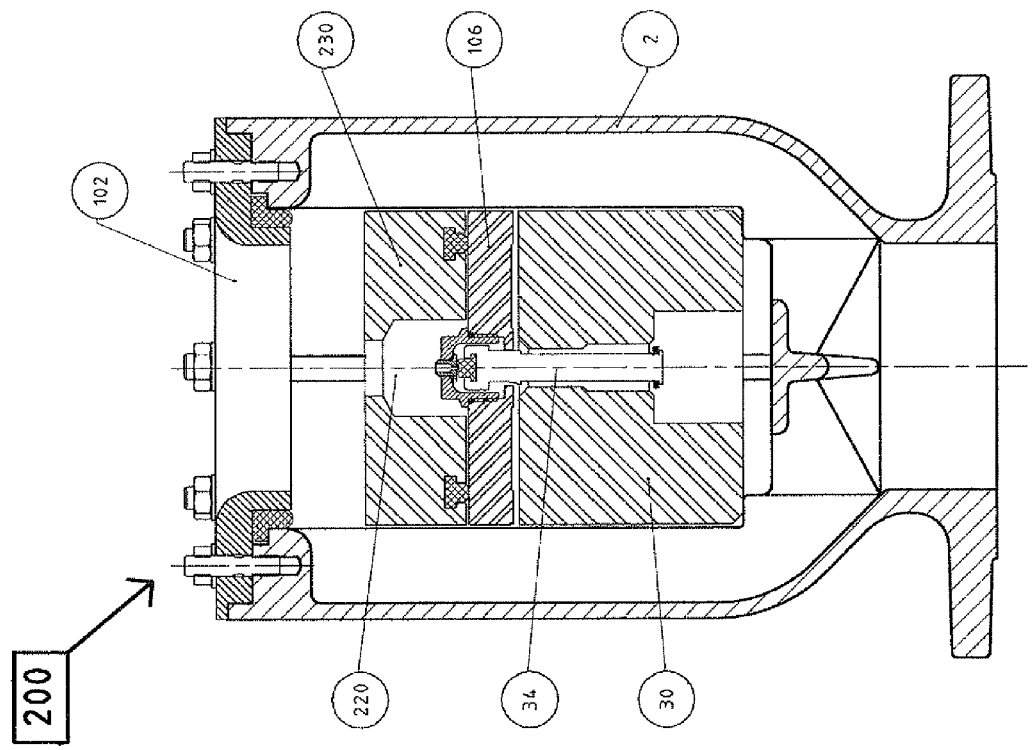
FIG. 8 is a cross sectional view of the air release vent valve of FIG. 7, shown at a partially closed deployment.
Figure 9:
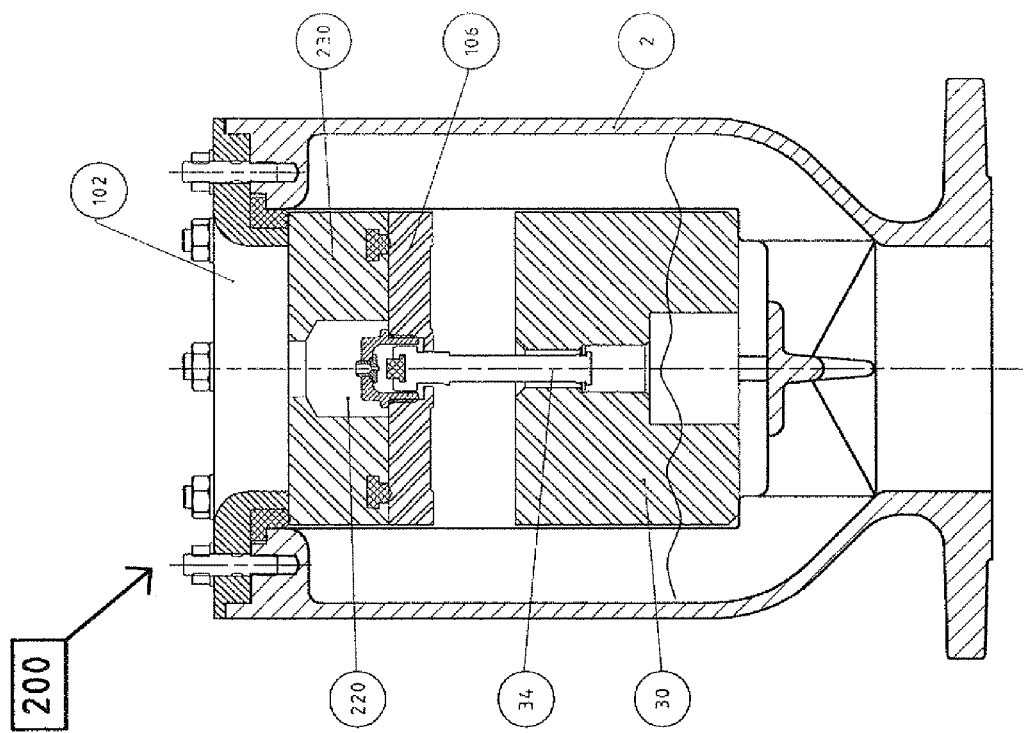
FIG. 9 is a cross sectional view of the air release vent valve of FIG. 7, shown at a fully closed deployment.
Figure 10:
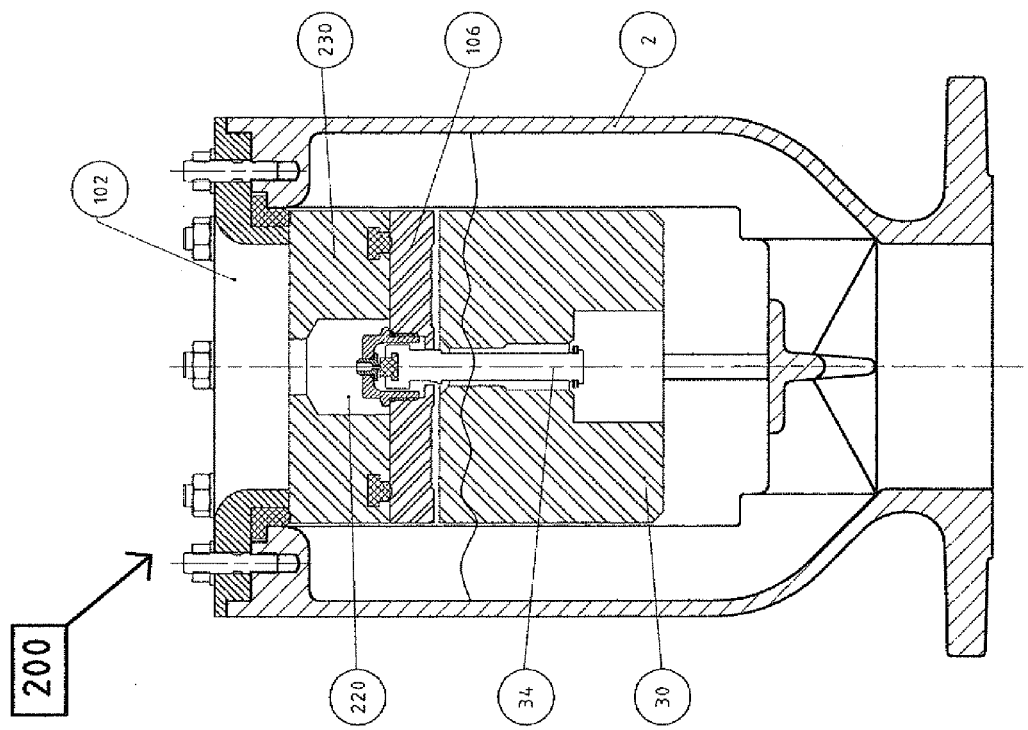
FIG. 10 is a cross sectional view of the air release vent valve of FIG. 7, shown at a partially open deployment.

As will be discussed below, it should be understood that the feature of a bi-water-level two stage delayed air vent action that distances the air venting orifice from the surface of the water with in the valve body, thereby preventing water mist form spraying out is illustrated herein in its simplest manifestation in the first preferred embodiment of FIGS. 1-3. The second preferred embodiment of the present invention, as illustrated in FIGS. 4-6, builds upon the first embodiment by adding a displaceable element that is responsive to both the liquid level within the valve body and any pressure differential between the ambient outside pressure and the pressure within the valve body. The third preferred embodiment of the present invention, as illustrated in FIGS. 7-10, and the variant embodiment of FIG. 11, build on the second embodiment by adding a displaceable element that is responsive to both the flow of air through an initial large outlet opening in the valve body and any pressure differential between the ambient outside pressure and the pressure within the valve body.

It should be noted that all of the embodiments of the present invention illustrated herein are shown with a direct float actuator as apposed to a float and lever mechanism, which is common in the art. It will be appreciated that a direct float arrangement provides a more reliable operation as well as be easier and more cost effective to manufacture. However, the illustration of a direct float arrangement is not intended as a limitation to the scope of the present invention, rather simply as a manner of illustrating what the inventor considers to currently be the best mode of practicing the principles of the present invention. Therefore, substantially any suitable float arrangement is within the scope of the present invention.

Throughout this document, the term "water" is used, for the easy of reading, to synonymously refer to any liquid that may be moved through a pipeline; therefore, these terms may be used interchangeably.

Figure 1:
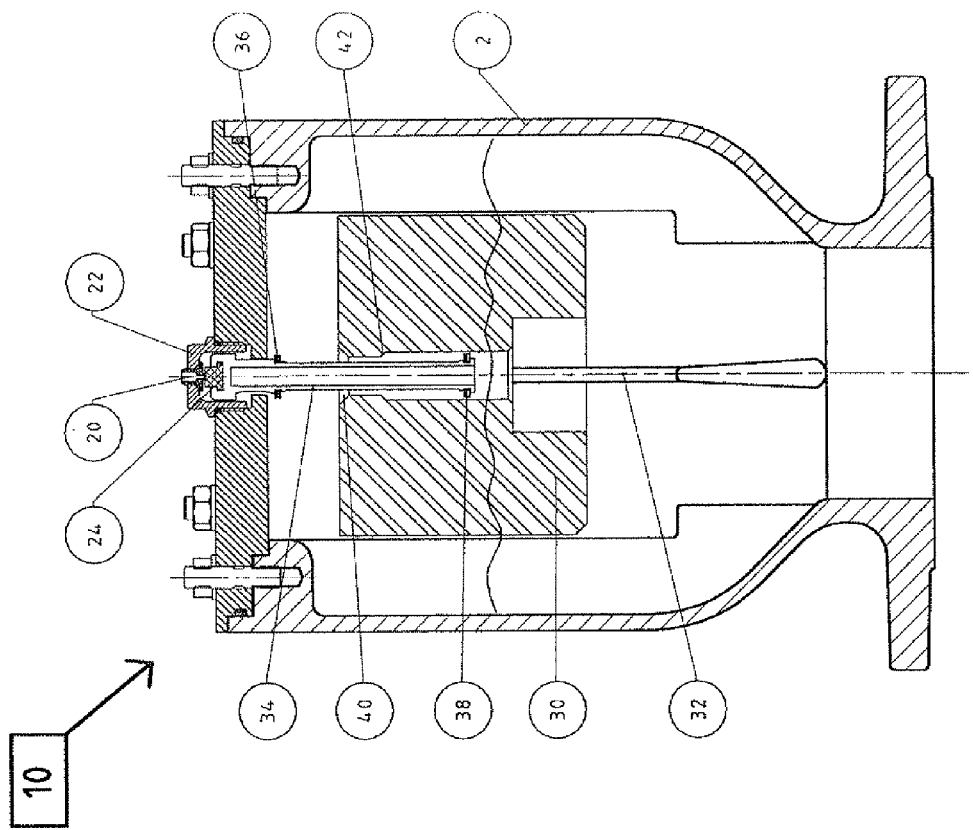
FIG. 1 is a cross sectional view of a first preferred embodiment of an air release vent valve constructed and operational according to the teachings of the present invention, shown here at a fully open deployment.
Figure 2:
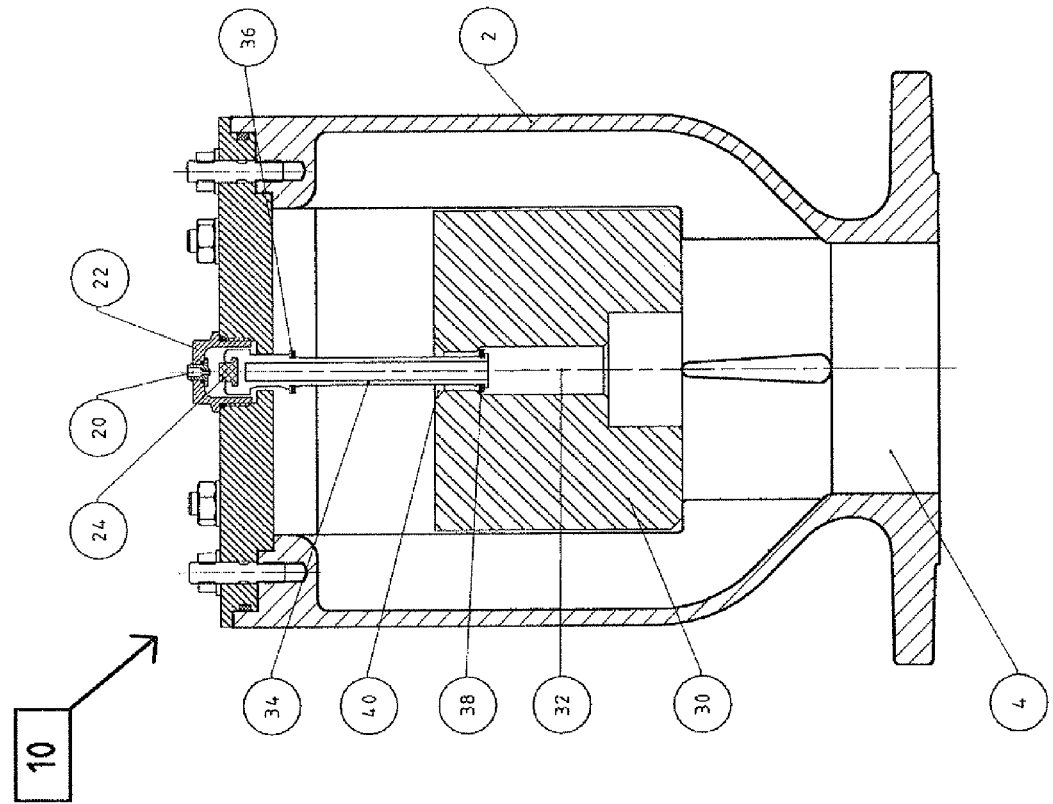
FIG. 2 is a cross sectional view of the air release vent valve of FIG. 1, shown at a partially closed deployment.
Figure 3:
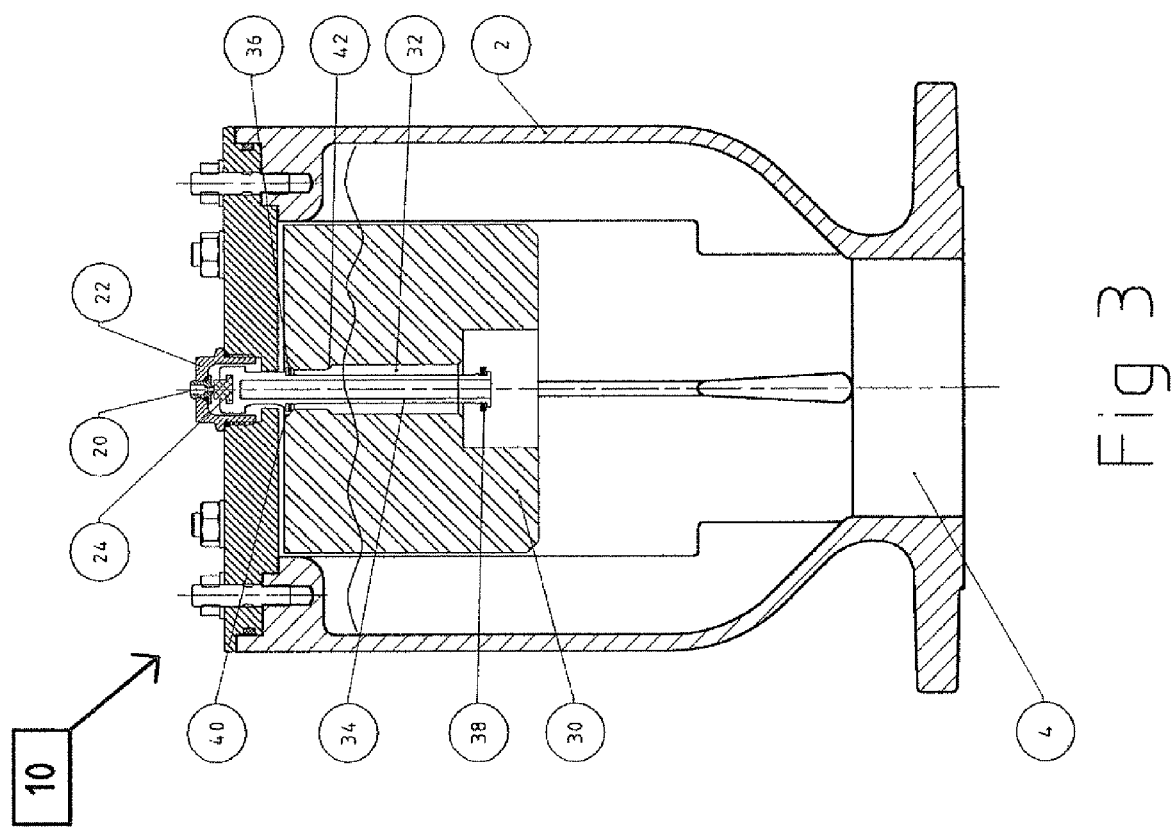
FIG. 3 is a cross sectional view of the air release vent valve of FIG. 1, shown at a fully closed deployment.

Referring now to the drawings, FIGS. 1-3 illustrate a first preferred embodiment of the present invention generally referred to as M.

The air release vent valve of FIGS. 1-3 includes a valve body 2 with an inlet port 4 on its bottom and a relatively small diameter venting orifice 20 configured in an orifice cap 22 mounted on the top cover 6 of the air valve 2. The direct float 30 is configured with an axial passageway 32 running through the center of the direct float 30. At least a portion of one end of a hollow displaceable orifice closure rod 34 is deployed in at least a portion of the axial passageway 32 and is longitudinally displaceable therein. It will be appreciated that displaceable orifice closure rod 34 may be configured as a solid rod that is displaced by means of a spring, for example, or substantially and suitable mechanism The opposite end of displaceable orifice closure rod 34 is at least partially deployed within orifice cap 22, such end being configured with an orifice sealing element 24.

The range of displacement of the orifice closure rod 34 is limited by the interaction of the upper stop element 36 and lower stop element 38 and their respective corresponding upper float stop region 40 and lower float stop region 42 (best seen in FIG. 2).

In operation, as the water level in the valve body rises, both the float 30 and the orifice closure rod 34 rise with the water level. Since the orifice closure rod 34 extends above the float 30, the orifice sealing element 24 comes into contact with the orifice cap 22 so as to at least partially seal venting orifice 20 while the water level is still too low in the valve body to cause any mist to exit through the venting orifice 20, thereby completing the first stage of the bi-water-level two stage delayed air vent action that prevents water mist faun spraying out.

It should be appreciated that the orifice closure rod 34 extends above the float 30 due to its own innate buoyancy resulting from its hollowness. Alternatively, any number of spring configurations may be employed to achieve the same result.

If the water level in the valve body continues to rise, the float will also rise. When the upper float stop region 40 comes into contact with, and presses against, the upper stop element 36 the upward force of the float 30 is added to the upward force of the orifice closure rod 34 so as to fully seal the venting orifice 20, as seen in FIG. 3, thereby completing the first stage of the bi-water-level two stage delayed air vent action.

Upon a drop in the water level within the valve body, as the water level drops, the float 30 also drops. Upon this initial drop in water level as the float 30 drops within the valve body, the orifice closure rod 34 is held in place, and thereby continues to at least partially seal the venting orifice 20, by any pressure differential between the ambient outside pressure and the pressure within the valve body.

As the water level continues to recede, the lower float stop region 42 of the float 30 comes into contact with the lower stop element 38 of the orifice closure rod 34, thereby pulling the orifice closure rod 34 down so as to fully open the venting orifice 20.

With regard to the description of the remaining embodiments disclosed herein, elements that are similar to, or perform a similar operation as corresponding elements of the first preferred embodiment described above are numbered the same as the corresponding elements of the first preferred embodiment.

Turning now to the second preferred embodiment of an air release vent valve 100 of the present invention as illustrated in FIG. 4-6, the operational relationship of the valve body 2, float 30 and the orifice closure rod 34 is substantially the same as described above. However, the top of the valve body 2 is configured as a relatively large initial venting orifice referred to herein as the kinetic orifice 102 that allows significantly more air to be vented from the pipeline. Deployed around the perimeter of the kinetic orifice 102 is a sealing element 104 such as, but not limited to an 0-ring.

It will be readily apparent the this embodiment includes a displaceable kinetic orifice seal plate 106 that rests on the float 30 when there is no water in the valve body 2, or the water level is so low as to not cause displacement of the float 30. The kinetic orifice seal plate 106 is responsive to both the water level within the valve body 2 and any pressure differential between the ambient outside pressure and the pressure within the valve body 2.

It will be noticed that the orifice cap 22, which includes the venting orifice 20, is mounted on the kinetic orifice seal plate 106 and therefore is operational only when the kinetic orifice seal plate 106 is deployed in a sealing position, as will be described below. Therefore, the venting orifice 20 becomes a secondary orifice in the embodiments of the present invention that have kinetic orifice 102.

In operation, when the water level is below the level at which the float 30 has raised to the point of sealing the kinetic orifice 102, air is vented through the fully open kinetic orifice 102, thereby allowing large volumes of air to be vented as necessary.

As the water level rises with in the valve body 2, the float 30, with the kinetic orifice seal plate 106 resting on top, also rises. When the water level is high enough, the top of the kinetic orifice seal plate 106 contacts the kinetic orifice sealing element 104, thereby closing the vent valve 100.

When the water level drops, the float 30 drops with the water level, however, the kinetic orifice seal plate 106 is held in place, and thereby continues to at least partially seal the kinetic orifice 102, by any pressure differential between the ambient outside pressure and the pressure within the valve body 2.

When the water level within the valve body 2 falls enough the lower float stop region 42 of the float 30 comes into contact with the lower stop element 38 of the orifice closure rod 34, thereby pulling the orifice closure rod 34 down so as to fully open the venting orifice 20, thereby allowing the air to be vented through the smaller venting orifice 20.

When the pressure differential between the ambient outside pressure and the pressure within the valve body 2 becomes equal, that is to say a zero pressure differential, the kinetic orifice seal plate 106 drops, by virtue of gravity, and rests again on the top of the float 30. This action allows large volumes of air to flow into the pipeline as necessary to prevent formation of a vacuum state within the pipeline, thereby preventing the potentially destructive result of such a vacuum state within the pipeline.

Regard to the description of the third embodiment of the present invention disclosed herebelow, elements that are similar to, or perform a similar operation as corresponding elements of the first and second preferred embodiments described above are numbered the same as the corresponding elements of those embodiments.

Referring now to the third preferred embodiment of the air release vent valve 200 illustrated in FIGS. 7-10, the valve body 2 is configured with a kinetic orifice 102. Deployed within the valve body 2, are a float 30, kinetic orifice seal plate 106, an orifice cap 22, which includes the venting orifice 2 106, that is mounted on the kinetic orifice seal plate 106 and an orifice closure rod 34. The operational interaction of these components is basically the same as described above. Added to this embodiment is a displaceable surge prevention element 230 that rests on top of the kinetic orifice seal plate 106. The surge prevention element 230 is responsive to both the flow of air through the large kinetic orifice 102 and any pressure differential between the ambient outside pressure and the pressure within the valve body 2. The surge prevention element 230 is configured with an outlet orifice 220 that may be enlarged in its lower portion to accommodate the extension of the orifice cap 22 above the kinetic orifice seal plate 106.

Consequent to the process of filling the pipeline with water, the air in the pipe is compressed and progressively vents out of the pipeline at a high velocity through the air release vent valves deployed in the pipeline. As the kinetic orifice seal disc 106 starts to rise floating on top of the float 30, kinetic orifice seal disc 106 will be drawn by the overly high air flow stream and slam to the closed deployment, thereby causing a pressure surge. Left unchecked, such pressure surges are potentially destructive and therefore it is beneficial to control them.

To that end, when the airflow velocity through the kinetic orifice 102 reaches a predetermine value the aerodynamic conditions within the valve body 2 are such that the surge prevention element 230 is drawn upward and partially closes the kinetic orifice 102, thereby forcing the air to vent out through the smaller surge prevention orifice 220. This action substantially slows the flow of air through the air release vent valve 200, which in turn reduces the velocity of the air, thereby substantially preventing kinetic orifice seal disc 106 from slamming to the closed deployment and causing a pressure surge.

This operation provides for high capacity venting during the first stage and low capacity venting during the second stage, thereby staging the air valve closure.

It will be appreciated that the surge prevention element 230 is held in place, and thereby continues to at least partially seal the kinetic orifice 102, by any pressure differential between the ambient outside pressure and the pressure within the valve body 2.

As water enters the valve body 2 and the water level rises, the operation of this embodiment of the present invention is similar to the operation of the second embodiment as described above. Here, however, the kinetic orifice seal plate 106 interacts with the surge prevention element 230 rather than directly with the kinetic orifice 102.

Here too, when the pressure differential between the ambient outside pressure and the pressure within the valve body 2 becomes equal, that is to say a zero pressure differential, both the surge prevention element 230 and the kinetic orifice seal plate 106 drop, by virtue of gravity, and rest again on the top of the float 30. This action allows large volumes of air to flow into the pipeline as necessary to prevent formation of a vacuum state within the pipeline, thereby preventing the potentially destructive result of such a vacuum state within the pipeline.

Figure 11:
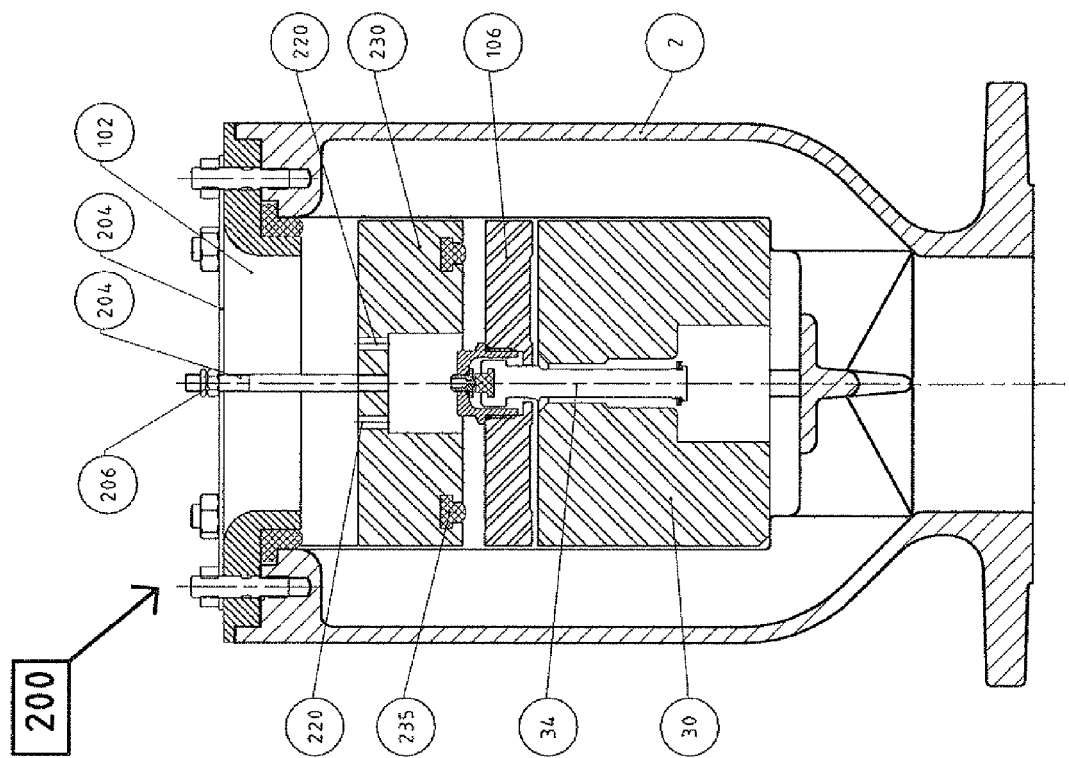
FIG. 11 is a cross sectional view of a variant embodiment of the air release vent valve of FIG. 7 that includes an adjustable surge prevention element.
Figure 12:
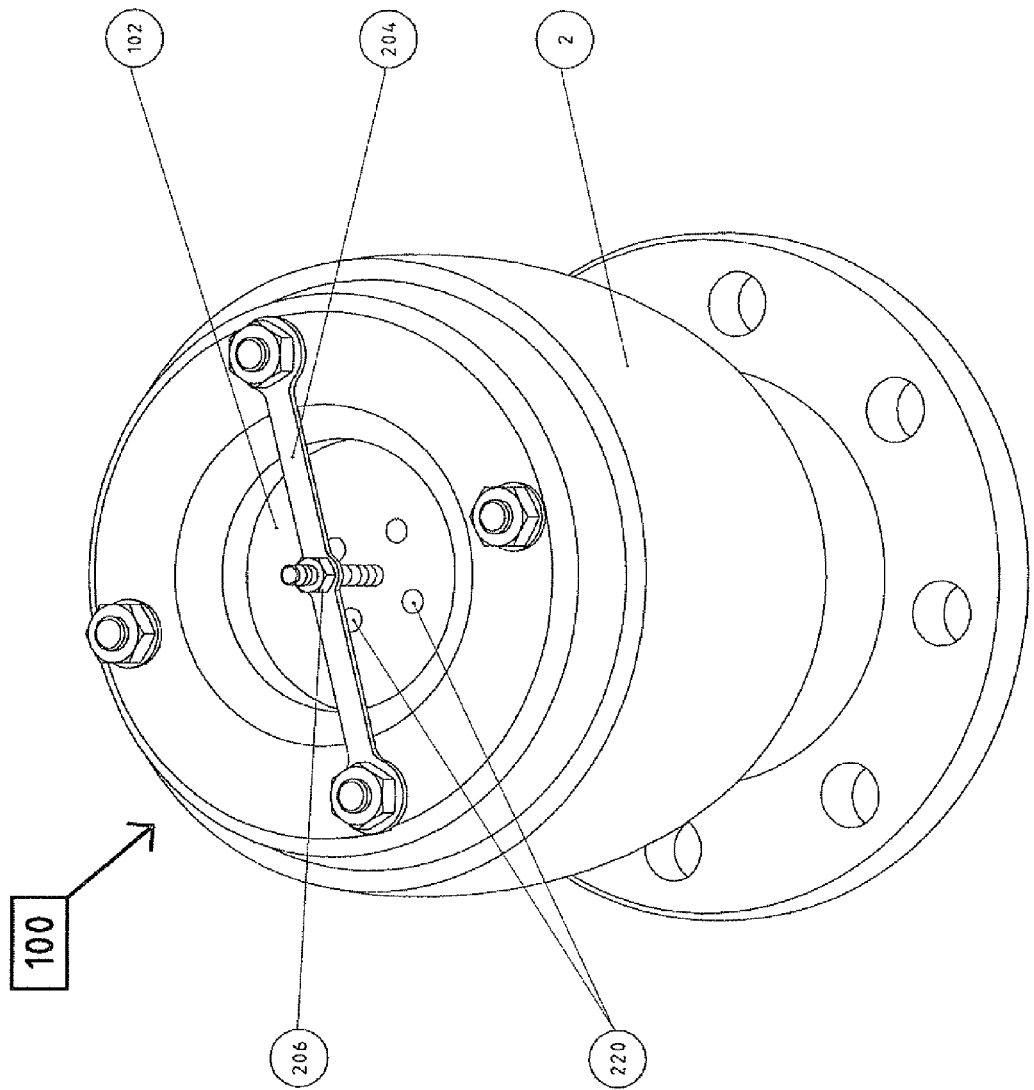
FIG. 12 is a top view of the embodiment of FIG. 11.

The variant embodiment 200' of FIG. 11 illustrates a further innovation of the present invention, specifically an adjustment mechanism that suspends the surge prevention element 230 above the kinetic orifice seal plate 106 that is resting on the float 30.

The adjustment mechanism includes a height adjustment rod 202 that is at least partially threaded. The threaded end of the height adjustment rod 202 passes through a support bridge 204 that spans the kinetic orifice 102. An adjustment nut is deployed on the threads of the height adjustment rod 202 above the support bridge 204.

It should be noted that the surge prevention orifice 220 of FIGS. 7-10 is configured here as a plurality of surge prevention orifices 220', such an arrangement provides for the adjustability of the air flow rate through the outlet orifice by plugging one or more of the plurality of outlet orifices. It will also be appreciated that the size of each of the plurality of outlet orifices need not be constant. That is t say, a surge prevention element 230 may be configured with a plurality of outlet orifices of varying sizes.

It will be appreciated that the suspended surge prevention element 230 is suspended above, and therefore not part of, the kinetic orifice seal plate 106 and float 30 combination.

It will be understood that the operation of this variant embodiment and the embodiment of FIGS. 7-10, with the addition of adjusting the height of the surge prevention element 230 and thereby controlling the predetermine value of the airflow velocity through the kinetic orifice 102 within the valve body 2 that draws the surge prevention element 230 upward so as to partially close the kinetic orifice 102.

It will be appreciated that the above descriptions are intended only to serve as examples and that many other embodiments are possible within the spirit and the scope of the present invention.

What is claimed is:

1. An air release vent valve comprising:
   (a) a valve body having an inlet port and a venting orifice;
   (b) a direct float configured with an axial passageway;
   (c) a displaceable orifice closure rod deployed in at least a portion of said axial passageway, said displaceable orifice closure rod being longitudinally displaceable therein;
   wherein at least a portion of said displaceable orifice closure rod extends above said direct float and at least a portion of said displaceable orifice closure rod is configured to close said venting orifice when a water level in said valve body reaches a predetermined level, and said venting orifice is configured as an initial vent orifice eonligured in said valve body and a secondary vent orifice, said intitial vent orifice is larger than said secondary vent orifice,
   (d) a displaceable vent orifice sealing element that is responsive to both a liquid level within said valve body and any pressure differential between an ambient outside pressure and a pressure within said valve body, said secondary vent orifice being configured in said displaceable vent orifice sealing element; and
   (e) a suspended surge prevention element that is suspended within said valve body below said initial orifice, said suspended surge prevention element configured with at least one surge prevention orifice that is larger than said secondary orifice so as to at least partially seal said initial orifice in response to a velocity of a flow of air through said valve body and said surge prevention element is held in such a deployment by a pressure differential between an ambient outside pressure and a pressure within said valve body.

2. The air release vent valve of claim 1, wherein a portion of said displaceable orifice closure rod is deployed within an orifice cap in which said venting orifice is configured.

3. The air release vent valve of claim 1, wherein at least a portion of said displaceable orifice closure rod extends above said direct float due to an innate buoyancy.

4. The air release vent valve of claim 1, wherein said suspended surge prevention element is suspended by an adjustment mechanism that includes:
   (a) a height adjustment rod extending from said suspended surge prevention element; and
   (b) a support bridge that spans said initial orifice.

5. The air release vent valve of claims 1, wherein said at least one surge prevention orifice is configured as a as a plurality of surge prevention orifices.

6. The air release vent valve of claim 5, wherein an air flow rate through said venting orifice is adjusted by plugging one or more of said plurality of surge prevention orifices.

7. An air release vent valve comprising:
   (a) a valve body having an inlet port and an initial vent orifice;
   (b) a direct float;
   (c) a suspended surge prevention element that is suspended within said valve body below said initial orifice, said suspended surge prevention element is configured to seal said initial vent orifice in response to a velocity of a flow of air through said valve body, said suspended surge prevention element being drawn upward by said flow of air through said valve body and said surge prevention element is held in such a deployment by a pressure differential between an ambient outside pressure and a pressure within said valve body, said suspended surge prevention element is configured with a at least one surge prevention orifice
   (d) an axial passageway configured in said direct float; and
   (e) a displaceable orifice closure rod deployed in at least a portion of said axial passageway, said displaceable orifice closure rod being longitudinally displaceable therein;
   wherein at least of portion of said displaceable orifice closure rod extends above said direct float and at least a portion of said displaceable orifice closure rod is configured to close said secondary vent orifice when a water level in said valve body reaches a predetermined level.

8. The air release vent valve of claim 7, wherein said suspended surge prevention element is configured with at least one surge prevention orifice that is smaller than said initial vent orifice so as to at least partially seal said initial vent orifice in response to a velocity of a flow of air through said valve body and said surge prevention element is held in such a deployment by a pressure differential between an ambient outside pressure and a pressure within said valve body.

9. The air release vent valve of claim 8, wherein said at least one surge prevention orifice is configured as a as a plurality of surge prevention orifices.

10. The air release vent valve of claim 9, wherein an air flow rate through said venting orifice is adjusted by plugging one or more of said plurality of surge prevention orifices.

* * * * *